United States Patent [19]

Collins, Jr.

[11] Patent Number: 5,013,899

[45] Date of Patent: May 7, 1991

[54] SCANNING SYSTEM HAVING LOW QUIESCENT CURRENT SCANNING MIRROR MOTOR DRIVER CIRCUITRY

[75] Inventor: Donald A. Collins, Jr., Ithaca, N.Y.

[73] Assignee: NCR Corporation, Dayton, Ohio

[21] Appl. No.: 387,191

[22] Filed: Jul. 28, 1989

[51] Int. Cl.⁵ ............................................. H02K 29/08
[52] U.S. Cl. .................................. 235/462; 235/470; 235/472; 318/138; 318/254
[58] Field of Search ................... 235/462, 470, 472; 318/138, 254, 439

[56] References Cited

U.S. PATENT DOCUMENTS

| | | | |
|---|---|---|---|
| 3,581,173 | 5/1971 | Hood | 318/254 |
| 4,030,005 | 6/1977 | Doemen | 318/138 |
| 4,396,875 | 8/1983 | Yamaguchi | 318/254 |
| 4,471,280 | 9/1984 | Stack | 318/256 X |
| 4,709,195 | 11/1987 | Hellerson et al. | 318/254 |
| 4,734,841 | 3/1988 | Elliot et al. | 235/470 X |

Primary Examiner—Stuart S. Levy
Assistant Examiner—Steven M. duBois
Attorney, Agent, or Firm—Wilbert Hawk, Jr.; Stephen F. Jewett; Gregory P. Gadson

[57] ABSTRACT

A microprocessor-controlled scanning system having a scanning element which is driven by a three-phase DC motor has low quiescent current motor driver circuitry. A bus driver chip normally used to drive a computer memory bus is novelly used in place of a prior art triple half-bridge circuit to source and sink the drive windings of the motor, thus significantly reducing the drive circuitry power requirement.

10 Claims, 4 Drawing Sheets

SCANNING SYSTEM HAVING LOW QUIESCENT CURRENT SCANNING MIRROR MOTOR DRIVER CIRCUITRY

BACKGROUND OF THE INVENTION

The present invention generally relates to scanning systems capable of reading bar codes. More particularly, the present invention provides low quiescent current driver circuitry for the scanning element motor.

Some scanning systems of the laser (light amplification by stimulated emission of radiation) type focus a laser beam upon a motor driven, rotating or dithering scanning mirror such that the laser beam forms a scanning pattern across a target bar code. The scanning laser beam is back-reflected to a photodetector, which determines the intensity of the back-reflected laser beam and outputs a current in proportion thereto. Thus a varying signal is output by the photodetector as the laser beam sweeps across a pattern of light and dark "bars" in a bar code.

Control circuitry controls the cooperation and coordination of the components (including the timing) and converts the photodetector output signal into useful form. Scanning speed is chiefly controlled by the speed of the motor.

The preferred embodiment of the present invention has a three-phase, direct current (DC) motor of the brushless type. Rather than using a commutator (for appropriately reversing the magnetic fields to "pull" the armature around its axis), varying signals (commutation logic) are applied to the appropriate windings to cause the magnetic fields to constantly change. The commutation logic is microprocessor controlled.

A three-phase motor is used instead of a single-phase motor since it provides for constant instantaneous power, and therefore a constant speed—an important feature for scanning operations.

Hand-held scanning systems such as the preferred embodiment have practical weight and size requirements for easy handling. Thus small components—especially the scanning mirror motor—are needed. Prior art scanning system motor driver circuits which normally drive motors with approximately 100 milliamps operating current require much more quiescent current (2 milliamps for example) than is practical for a small motor drawing, for example, 18-20 milliamps (the preferred embodiment) of operating current. Thus the driver circuitry and battery power source are much larger than desirable.

SUMMARY OF THE INVENTION

It is an object of the present invention to provide a laser scanning system having scanning mirror motor driver circuitry which has low quiescent current consumption.

It is another object of the present invention to provide a laser scanning system wherein the scanning mirror motor driver circuitry occupies a small circuit region.

It is yet another object of the present invention to implement the above objects in a handheld unit.

There is provided in accordance with the present invention, a laser scanning system capable of reading the likes of a bar code. The present invention includes a motor having a maximum operating current of 10 milliamps, a movable scanning element connected to the motor, a laser for producing a laser beam for focus upon and deflection by the scanning element, the laser beam being able to scan the likes of a bar code, sensor means connected to the motor for outputting signals corresponding to scanning element movement, and motor drive circuitry for driving the motor in response to output signals from the sensor means, and having a maximum quiescent current of 5 microamps.

The above and other objects, features, and advantages of the present invention will become apparent from the following description with reference to the attached drawings.

DETAILED DESCRIPTION OF THE INVENTION

Figure 1:
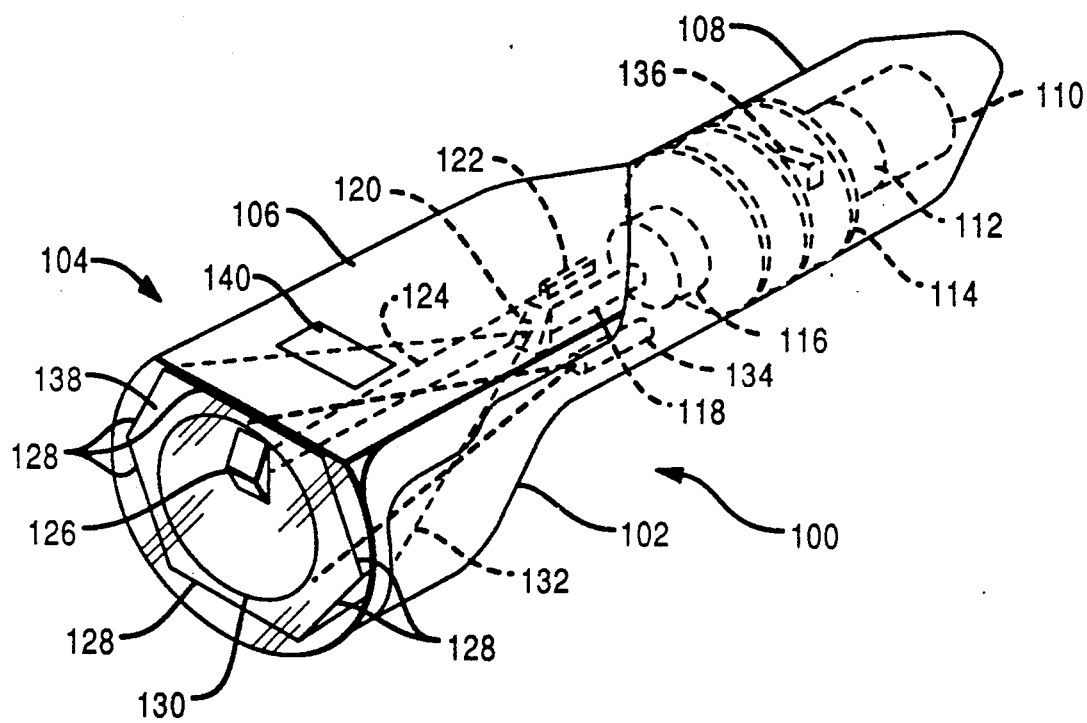
FIG. 1 is a perspective view, with certain internal, hidden details shown in phantom, of a handheld laser scanner capable of incorporating the present invention.
Figure 2:
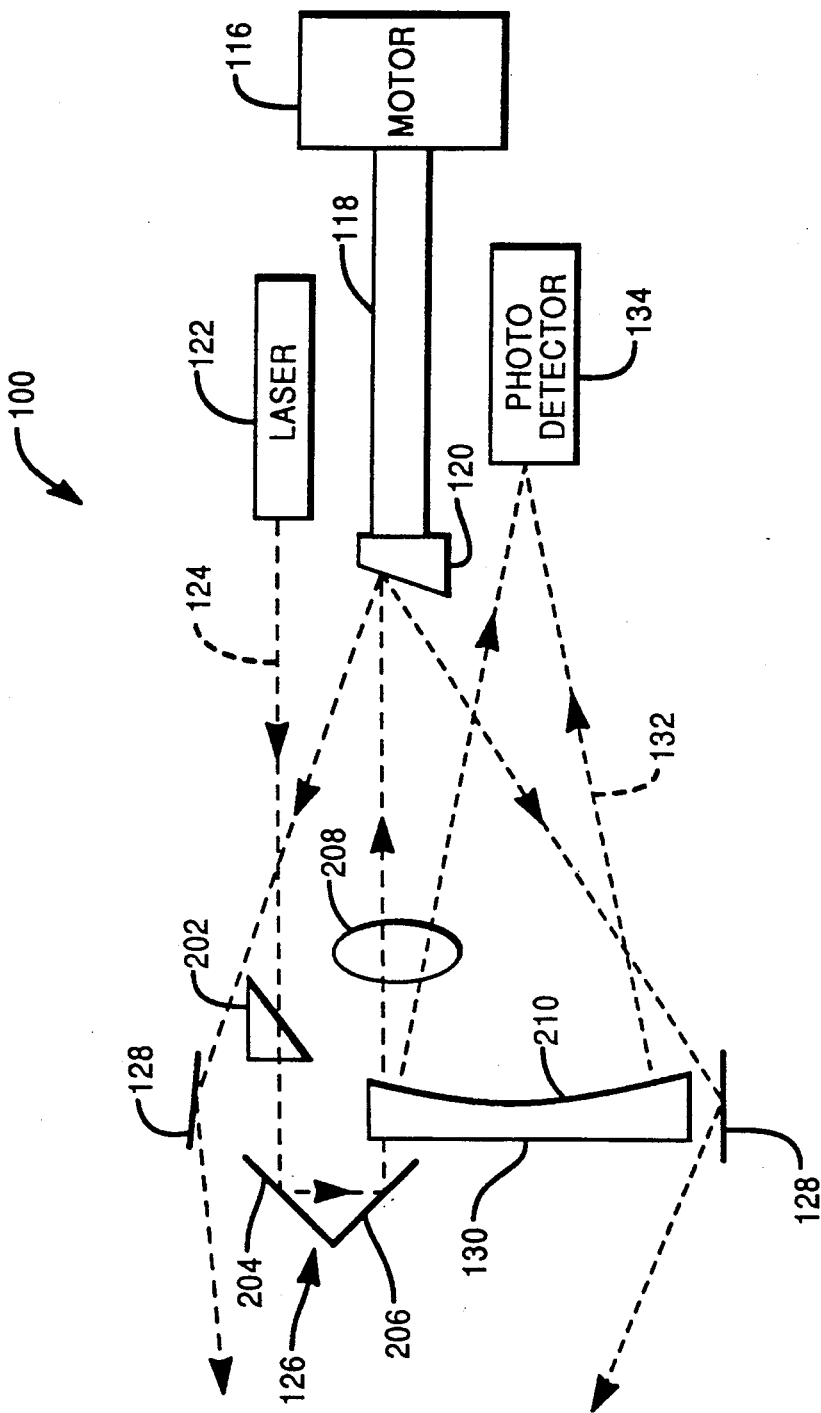
FIG. 2 is a schematic diagram of the scanner in FIG. 1.

Referring now to FIGS. 1 and 2, a hand-held laser scanner 100 having a casing 102 and a front portion 104 is shown. The front, upper portion 106 of the casing 102 is a flat surface in the present embodiment, while the rear portion 108 of the casing 102 is in the form of a handle.

A power supply 110 (which may be of the battery or line power variety) supplies power to the components of the scanner 100. A radio transmitter 112 transmits radio signals to a receiver in a remote processing unit (not shown) indicative of a scanned bar code (not shown). The handle 108 also includes electrical rack members 114, and a motor 116 connected to a rotatable shaft 118, which motor and shaft rotate a scanning element 120 attached to the shaft 118 for altering the path of a laser beam. The scanning element is a mirror in the preferred embodiment.

A laser or laser diode member 122 emits a laser beam 124 which is back-reflected by a pair turning mirrors 126 which are arranged at an angle of 90° relative to each other. The rotating scanning element 120 reflects the laser beam received from the turning mirrors 126 toward six turning mirrors 128 located at the front portion 104 of the scanner 100. The turning mirrors 128 direct light derived from the laser 122 toward a bar code label (not shown) on a product to be scanned, for example.

A collection lens 130 collects and focuses light reflected from the bar code label along paths 132 upon a photodetector 134. The photodetector 134 converts the received light into electrical signals indicative of the light intensity. The turning mirrors 126 are mounted on the collection lens 130, which is in turn mounted on a glass plate member 138. A processing member 136 mounted on one of the electrical rack members 114 receives and converts the electrical signals output by the photodetector 134 into data used to address a lookup table in the remote processing unit. The data output by the processing member 136 is transmitted to the remote processing unit by the radio transmitter 112.

A user interface portion 140 contains a light-emitting-diode (LED) display and a speaker for audio-visually indicating to the user whether a current scan operation has been successful.

The scanning operation will now be examined more closely with reference to FIG. 2. The drive shaft 118 rotates the scanning element 120 via the motor 116. Light from the laser 122 along path 124 is circularized by an anamorphic prism 202, and then back-reflected by the turning mirrors 126 composed of turning mirrors 204 and 206. The light reflected from the turning mirror 126 is focused by a lens 208 onto the surface of the scanning element 120. The rotation of the scanning element 120 causes light to be reflected toward the turning mirrors 128. The light reflected from the turning mirrors 128 falls upon the target bar code label in the form of scan lines, as is well known in the art.

The light reflected from the bar code label is collected and transmitted to the photodetector 134 by the collection lens 130 which has a concave surface 210. A more detailed description of the abovementioned features of the hand-held laser scanner of the present invention can be found in U.S. patent application Ser. No. 284,643, filed on Dec. 15, 1988 and assigned to the assignee of the present application, which application Ser. No. 284,643 is hereby expressly incorporated by reference.

Figure 3:
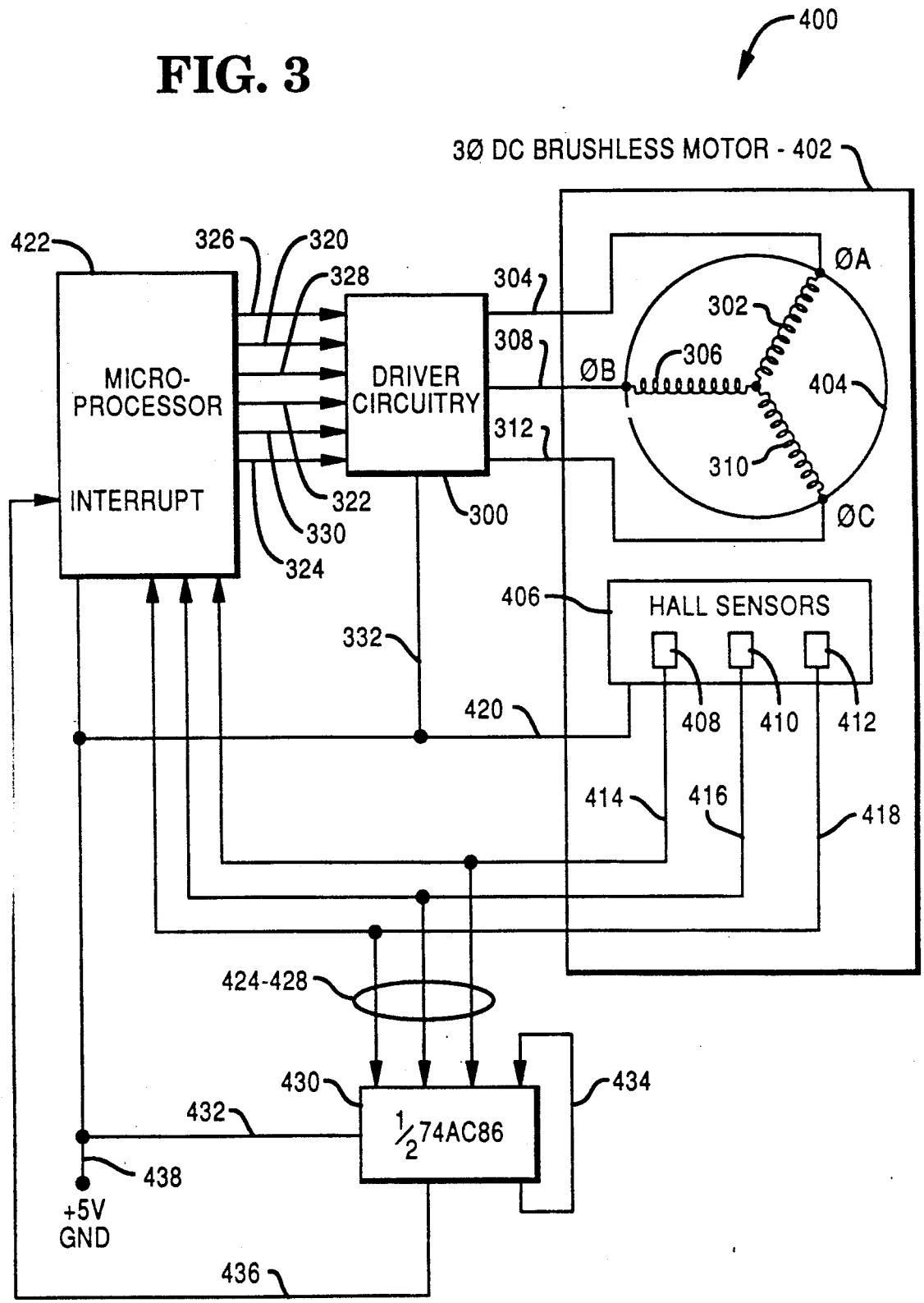
FIG. 3 is a schematic diagram of the motor driver circuitry.

Turning to FIG. 3, motor and drive control circuitry 400 for the present invention are shown. A motor unit 402 contains a three-phase, brushless DC motor 404 which has three sets of equispaced armature coils 302, 306 and 310 connected by lead lines 304, 308 and 312, respectively. The lead lines 304, 308 and 312 are connected to a bus driver 300, which supplies the necessary voltages to the sets of armature coils 302, 306 and 310 for rotation of the the rotor (not shown) at a constant speed. The bus driver 300 will be described in greater detail later in connection with FIG. 4.

The bus driver 300 is connected by a group of control leads 320-330 to a microprocessor 422, which supplies the commutation logic necessary for motor operation. A Hall sensing unit 406 contains three Hall sensors 408, 410 and 412 spaced 60° apart, each connected to leads 414, 416 and 418, respectively. A 5 volt power source 438 supplies power via line 420 to the Hall sensing unit, and power to the other units via lines 332 and 432 as shown. The Hall sensors detect movement of the rotor and send signals evidencing the same to the microprocessor 422 and Exclusive Or (XOR) gate 430 (having one of its inputs tied to an output via line 434) via leads 424-428. The XOR gate 430 outputs an interrupt signal to the microprocessor 422 via line 436 when any of the Hall sensors sees a change in rotor position. The rotor movement is thus monitored every 360° of rotation.

Figure 4:
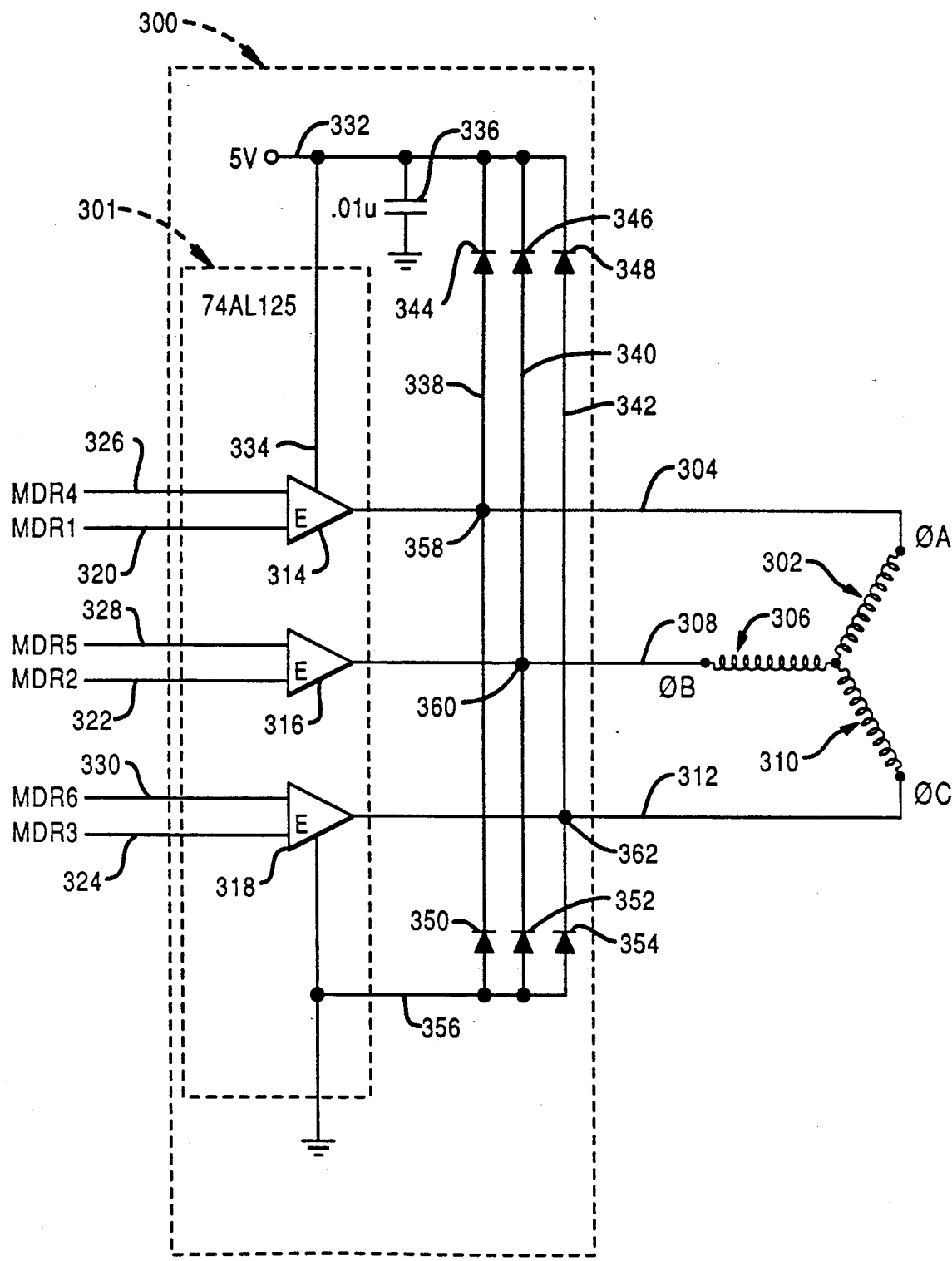
FIG. 4 is a schematic diagram of the control circuitry for the scanner motor.

Referring now to FIG. 4, there is shown the details of the bus driver 300 and its connection to the armature windings 302, 306 and 310 of the motor 404. In contrast to prior art scanning system triple half-bridge driver circuits (not shown) having a quiescent current of approximately 2 milliamps, the preferred embodiment of the driver circuit 300 (also of the triple half-bridge type) utilizes an integrated circuit chip 301 manufactured by National Semiconductor or Hitachi and identified as "74AC125", that chip having a quiescent current of only 2 microamps—1000 times lower than the prior art triple half bridge circuit. Integrated circuit chip 74AC125, a four gate chip, was designed for use as a computer system memory bus driver.

The drive windings 302, 306 and 310 of the motor to be driven are shown connected to lead lines 304, 308 and 312, respectively. The aforementioned lead lines are respectively connected to gates 314, 316 and 318, which gates are of the three-state variety and each have two inputs (320 and 326 for gate 314, 322 and 328 for gate 316, and 324 and 330 for gate 318) and one output. Each gate replaces a P-channel Hexfet and an N-channel Hexfet in the typical prior art triple half-bridge circuit. The input signals MDR1-MDR6 are supplied by the microprocessor 422 in FIG. 4 and control the operation of the gates to source and sink current through the motor drive windings.

A 5-volt power supply 332 connects the chip 301 via line 334, connects a grounded 0.01 microfarad capacitor 336, and connects three parallel lines 338-342. The lines 338-342 each have a pair of diodes 344/350, 346/352 and 348/354, respectively. The three lines 338-342 form node points 358, 360 and 362 with lines 304, 308 and 312, respectively. Lines 338-342 are also connected to ground and to the chip 301 via line 356.

The input signals MDR1, MDR2 and MDR3 are enable signals which, when at a logic low value, cause the values of the other gate input signals MDR4, MDR5 and MDR6 to appear at the gate outputs. When an enable signal is at the logic high value the associated gate "floats" (a high impedance state), and neither sources nor sinks current. The drive windings 302, 306 and 310 are appropriately sourced and sinked under the control of the input signals MDR1-MDR6 to drive the motor armature. For example, to source current into winding 302 and sink current out of winding 306, MDR1, MDR2 and MDR5 are low, MDR3 and MDR4 are high, and MDR6 may be either low or high. As another example, to source current into winding 306 and sink current out of winding 310, MDR2, MDR3 and MDR6 are low, MDR1 and MDR5 are high, and MDR4 may be either low or high.

Variations and modifications to the present invention are possible given the above disclosure. However, variations and modifications which are obvious to those skilled in the art are intended to be within the scope of this letters patent. For example, the laser scanning system of the present invention is not limited to use in hand-held units.

I claim:

1. A laser scanning system capable of reading the likes of a bar code comprising:
    a motor having a maximum operating current of 10 milliamps;
    a movable scanning element coupled to said motor;
    a laser for producing a laser beam for focus upon and deflection by said scanning element, said laser beam being able to scan the likes of a bar code;
    sensor means coupled to said motor for outputting signals corresponding to scanning element movement; and
    motor drive circuitry for driving said motor in response to output signals from said sensor means, and having a maximum quiescent current of 5 microamps.

2. The laser scanning system in claim 1 further comprising a microprocessor for controlling said laser, and motor drive circuitry.

3. The laser scanning system in claim 1 wherein said laser scanning system is of the hand-held type.

4. The laser scanning system in claim 1 wherein said scanning element is moved in a rotating manner.

5. The laser scanning system in claim 1 wherein said scanning element is moved in a dithering manner.

6. The laser scanning system in claim 1 wherein said scanning element is moved in either a rotating or dithering manner.

7. The laser scanning system in claim 1 wherein said sensors check said scanning element movement every 60°.

8. The laser scanning system in claim 1 wherein said sensors means comprises Hall sensors.

9. The laser scanning system in claim 1 wherein said motor is of the three-phase, DC type.

10. The laser scanning system in claim 1 wherein said laser scanning system is of the handheld, battery operated type.

* * * * *